(12) United States Patent
Gelay (10) Patent No.: US 8,302,865 B2
(45) Date of Patent: Nov. 6, 2012

(54) METHOD, APPARATUS, AND SYSTEM FOR PROGRAMMING A BARCODE SYMBOL SCANNING TERMINAL WITH TWO-DIMENSIONAL PROGRAMMING CODE

(75) Inventor: Geoffrey Gelay, West Deptford, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/017,981

(22) Filed: Jan. 31, 2011

(65) Prior Publication Data

US 2012/0193426 A1    Aug. 2, 2012

(51) Int. Cl.
G06K 7/10 (2006.01)
G08C 21/00 (2006.01)
G03B 7/08 (2006.01)
G02B 26/10 (2006.01)
G06K 15/12 (2006.01)
G06K 19/00 (2006.01)
G06K 7/14 (2006.01)
G06K 5/00 (2006.01)

(52) U.S. Cl. .............. 235/462.07; 235/487; 235/454; 235/462.11; 235/462.24; 235/462.25; 235/462.41

(58) Field of Classification Search ............ 235/462.01, 235/462.13, 462.11, 462.24, 462.25, 462.41, 235/454, 487
See application file for complete search history.

(56) References Cited

U.S. PATENT DOCUMENTS

| | | | |
|---|---|---|---|
| 4,825,058 A | | 4/1989 | Poland |
| 4,861,972 A | | 8/1989 | Elliott et al. |
| 4,866,257 A | * | 9/1989 | Elliott et al. ............. 235/462.15 |
| 4,868,375 A | * | 9/1989 | Blanford ................. 235/462.15 |
| 5,214,268 A | * | 5/1993 | Doing ..................... 235/462.15 |
| 5,347,113 A | | 9/1994 | Reddersen et al. |
| 5,488,223 A | | 1/1996 | Austin et al. |
| 5,563,402 A | | 10/1996 | Reddersen et al. |
| 5,564,841 A | | 10/1996 | Austin et al. |
| 5,612,531 A | | 3/1997 | Barkan |
| 5,703,347 A | | 12/1997 | Reddersen et al. |
| 5,760,382 A | | 6/1998 | Li et al. |
| 5,773,807 A | | 6/1998 | Barkan et al. |
| 5,777,315 A | * | 7/1998 | Wilz et al. ............... 235/462.15 |
| 5,781,708 A | | 7/1998 | Austin et al. |
| 5,804,805 A | * | 9/1998 | Koenck et al. ........... 235/462.01 |
| 5,825,006 A | | 10/1998 | Longacre, Jr. et al. |
| 5,837,986 A | | 11/1998 | Barile et al. |
| 5,837,987 A | * | 11/1998 | Koenck et al. ........... 235/462.27 |
| 5,869,819 A | | 2/1999 | Knowles et al. |
| 5,869,840 A | * | 2/1999 | Helton ..................... 235/472.01 |
| 5,875,415 A | | 2/1999 | Lieb et al. |
| 5,900,613 A | | 5/1999 | Koziol et al. |
| 5,905,248 A | | 5/1999 | Russell et al. |
| 5,905,249 A | | 5/1999 | Reddersen et al. |
| 5,905,251 A | | 5/1999 | Knowles |

(Continued)

*Primary Examiner* — Daniel Walsh
(74) *Attorney, Agent, or Firm* — Heslin Rothenberg Farley & Mesiti P.C.

(57) ABSTRACT

A configuration system for configuring a barcode symbol scanning terminal using a two-dimensional barcode is provided.
The configuration system includes a two-dimensional imager terminal including an image sensor configured to collect an image representative of a two-dimensional barcode, wherein the two-dimensional imager terminal is configured to determine programming data based upon the image representative of the two-dimensional barcode and to transmit the determined programming data. The configuration system further includes a barcode symbol scanning terminal, wherein the barcode symbol scanning terminal receives the determined programming data from the two-dimensional imager terminal, wherein the barcode symbol scanning terminal is operative to be configured based upon the determined programming data.

23 Claims, 5 Drawing Sheets

U.S. PATENT DOCUMENTS

| | | | |
|---|---|---|---|
| 5,929,418 A | 7/1999 | Ehrhart et al. | |
| 5,932,862 A | 8/1999 | Hussey et al. | |
| 5,952,644 A | 9/1999 | Barkan | |
| 5,965,863 A | 10/1999 | Parker et al. | |
| 5,974,202 A | 10/1999 | Wang et al. | |
| 6,027,024 A | 2/2000 | Knowles | |
| 6,045,048 A | 4/2000 | Wilz, Sr. et al. | |
| 6,068,188 A | 5/2000 | Knowles | |
| 6,076,733 A | 6/2000 | Wilz, Sr. et al. | |
| 6,115,678 A | 9/2000 | Lieb et al. | |
| 6,152,369 A | 11/2000 | Wilz, Sr. et al. | |
| 6,161,760 A | 12/2000 | Marrs et al. | |
| 6,176,429 B1 | 1/2001 | Reddersen et al. | |
| 6,264,105 B1 | 7/2001 | Longacre, Jr. et al. | |
| 6,293,467 B1 | 9/2001 | Reddersen et al. | |
| 6,321,991 B1 | 11/2001 | Knowles | |
| 6,321,992 B1 | 11/2001 | Knowles et al. | |
| 6,338,434 B1 | 1/2002 | Wilz, Sr. et al. | |
| 6,347,743 B2 | 2/2002 | Wilz, Sr. et al. | |
| 6,375,078 B1 | 4/2002 | Russell et al. | |
| 6,386,453 B1 | 5/2002 | Russell et al. | |
| 6,394,354 B1 | 5/2002 | Wilz, Sr. et al. | |
| 6,412,699 B1 | 7/2002 | Russell et al. | |
| 6,464,139 B1 | 10/2002 | Wilz, Sr. et al. | |
| 6,491,223 B1 | 12/2002 | Longacre, Jr. et al. | |
| 6,505,776 B1 | 1/2003 | Wilz, Sr. et al. | |
| 6,505,778 B1 | 1/2003 | Reddersen et al. | |
| 6,510,997 B1 | 1/2003 | Wilz, Sr. et al. | |
| 6,565,005 B1 | 5/2003 | Wilz, Sr. et al. | |
| 6,568,595 B1 | 5/2003 | Russell et al. | |
| 6,612,495 B2 | 9/2003 | Reddersen et al. | |
| 6,622,917 B1 | 9/2003 | Knowles | |
| 6,655,595 B1 | 12/2003 | Longacre, Jr. et al. | |
| 6,776,342 B1 | 8/2004 | Thuries et al. | |
| 6,814,290 B2 | 11/2004 | Longacre | |
| 6,827,273 B2 | 12/2004 | Wilz, Sr. et al. | |
| 6,902,114 B2 * | 6/2005 | Hashimoto et al. | 235/462.25 |
| 6,988,662 B2 | 1/2006 | Russell et al. | |
| 7,059,525 B2 | 6/2006 | Longacre et al. | |
| 7,070,108 B1 | 7/2006 | Blanford et al. | |
| 7,077,317 B2 | 7/2006 | Longacre, Jr. et al. | |
| 7,077,321 B2 | 7/2006 | Longacre, Jr. et al. | |
| 7,080,786 B2 | 7/2006 | Longacre, Jr. et al. | |
| 7,104,456 B2 | 9/2006 | Parker et al. | |
| 7,124,948 B2 | 10/2006 | Longacre, Jr. et al. | |
| 7,281,659 B2 * | 10/2007 | Page | 235/462.07 |
| 7,337,317 B2 | 2/2008 | Meggitt et al. | |
| 7,337,968 B2 | 3/2008 | Wilz, Sr. et al. | |
| 7,341,191 B2 | 3/2008 | Russell et al. | |
| 7,367,514 B2 | 5/2008 | Soule, III et al. | |
| 7,380,705 B2 | 6/2008 | Terlizzi et al. | |
| 7,383,998 B2 | 6/2008 | Parker et al. | |
| 7,387,253 B1 | 6/2008 | Parker et al. | |
| 7,398,929 B2 | 7/2008 | Longacre, Jr. et al. | |
| 7,492,493 B2 | 2/2009 | Barber et al. | |
| 7,546,954 B2 | 6/2009 | Longacre, Jr. et al. | |
| 8,066,187 B2 * | 11/2011 | Zsigmond et al. | 235/462.01 |
| 2002/0117547 A1 * | 8/2002 | Krichever | 235/462.01 |
| 2002/0130181 A1 | 9/2002 | Reddersen et al. | |
| 2002/0185536 A1 * | 12/2002 | Tsunobuchi et al. | 235/454 |
| 2002/0185540 A1 * | 12/2002 | Hashimoto et al. | 235/462.25 |
| 2003/0006290 A1 * | 1/2003 | Hussey et al. | 235/472.01 |
| 2004/0065741 A1 * | 4/2004 | Reddersen et al. | 235/462.45 |
| 2004/0262394 A1 * | 12/2004 | Longacre et al. | 235/462.15 |
| 2005/0045726 A1 | 3/2005 | Terlizzi | |
| 2005/0211781 A1 * | 9/2005 | Cannon et al. | 235/462.35 |
| 2007/0119941 A1 * | 5/2007 | He | 235/462.15 |
| 2007/0131773 A1 * | 6/2007 | Motoi | 235/462.14 |
| 2007/0152058 A1 * | 7/2007 | Yeakley et al. | 235/462.01 |
| 2007/0194121 A1 * | 8/2007 | Yang et al. | 235/454 |
| 2007/0252007 A1 * | 11/2007 | Watanabe | 235/462.15 |
| 2008/0179388 A1 * | 7/2008 | Pang et al. | 235/375 |
| 2008/0203167 A1 | 8/2008 | Soule et al. | |
| 2008/0237331 A1 * | 10/2008 | Hammer | 235/375 |
| 2009/0001272 A1 * | 1/2009 | Hajjar | 250/354.1 |
| 2009/0057409 A1 | 3/2009 | Feinstein et al. | |
| 2009/0308927 A1 * | 12/2009 | Longacre et al. | 235/462.1 |
| 2010/0155481 A1 | 6/2010 | Vinogradov et al. | 235/462.21 |
| 2011/0161012 A1 * | 6/2011 | Black et al. | 702/19 |

* cited by examiner

METHOD, APPARATUS, AND SYSTEM FOR PROGRAMMING A BARCODE SYMBOL SCANNING TERMINAL WITH TWO-DIMENSIONAL PROGRAMMING CODE

FIELD OF THE INVENTION

The present invention relates generally to scanning devices, and, more specifically, to programming of a scanning device.

BACKGROUND OF THE PRIOR ART

Bar code reading terminals for reading decodable bar codes are available in multiple varieties. For example, minimally featured bar code reading terminals devoid of a keyboard and display are common in point of sale applications. Bar code reading terminals devoid of a keyboard and display are available in the recognizable gun style form factor having a handle and trigger button (trigger) that can be actuated by an index finger. Bar code reading terminals having keyboards and displays are also available. Keyboards and display equipped bar code reading terminals are commonly used in shipping and warehouse applications, and are available in form factors incorporating a display and keyboard. In a keyboard and display equipped bar code reading terminal, a trigger button for actuating the output of decoded messages is typically provided in such locations as to enable actuation by a thumb of an operator. Keyboard and display equipped bar code reading terminals are available in a form in which the keyboard and display are commonly provided by a display having an associated touch panel. Bar code reading terminals in a form devoid of a keyboard and display or in a keyboard and display equipped form are commonly used in a variety of data collection applications including point of sale applications, shipping applications, warehousing applications, security check point applications, and patient care applications. Bar code reading terminals are also available in a presentation reader form factor. Such terminals can be mounted at a check-out station. Some bar code reading terminals are adapted to read bar code symbols including one or more of one-dimensional (1D) bar codes, and two-dimensional (2D) bar codes.

SUMMARY OF THE INVENTION

A configuration system including a barcode symbol scanning terminal and a two-dimensional imager terminal is disclosed that provides improved methods and apparatus for configuring both terminals, among other advantageous features.

The two-dimensional imager terminal includes a central processing unit (CPU), memory communicatively coupled to the CPU, and a 2D image sensor. The two-dimensional imager terminal is configured to capture a frame of image data representing a two-dimensional barcode and to determine programming data based upon the frame of image data representing the two-dimensional barcode. The two-dimensional imager terminal further includes an input/output (I/O) interface for transmitting the determined programming data.

The barcode symbol scanning terminal includes a CPU, a memory communicatively coupled to the CPU, a housing comprising a first section and a second section. A first laser assembly is disposed within the first section of the housing. The first laser assembly includes a first laser beam generation unit for generating a first laser beam, one or more mirrors for projecting and scanning the first laser beam, one or more mirrors for focusing a first reflected laser beam onto a first photodetector unit, the first photodetector unit being configured for detecting the first reflected laser beam. The barcode symbol scanning terminal further includes a second laser assembly disposed within the second section of the housing, the second laser assembly including a second laser beam generation unit for generating a second laser beam, one or more mirrors for projecting and scanning the second laser beam, one or more mirrors for focusing a second reflected laser beam onto a second photodetector unit, the photodetector unit being configured for detecting the second reflected laser beam. The barcode symbol scanning terminal further includes an I/O interface for receiving the determined programming data from the I/O interface of the two-dimensional imager terminal, wherein the barcode symbol scanning terminal is operative to be configured based upon the determined programming data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
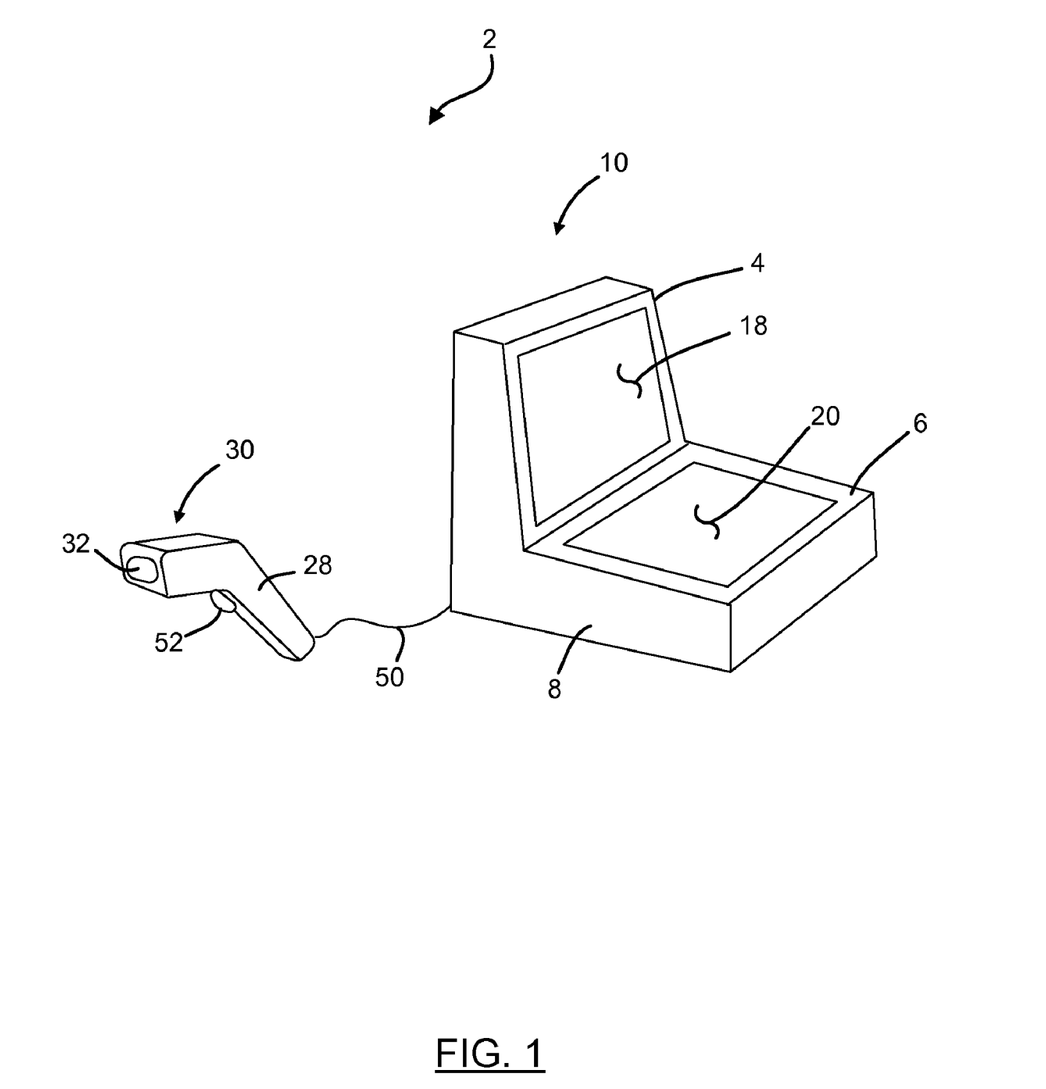
FIG. 1 is a system diagram illustrating a configuration system for configuring a barcode symbol scanning terminal in some embodiments.

In FIG. 1 there is shown a configuration system 2. The configuration system 2 may also operate as a data collection system in some embodiments. The configuration system 2 includes a barcode symbol scanning terminal 10 and a 2D imager terminal 30. The barcode symbol scanning terminal 10 and a 2D imager terminal 30 are connected through a communication link 50. A barcode (not illustrated) may be read by either barcode symbol scanning terminal 10 or 2D imager terminal 30. The barcode symbol scanning terminal 10 can be devoid of a 2D image sensor, and is only operable to scan 1D barcodes.

Figure 2:
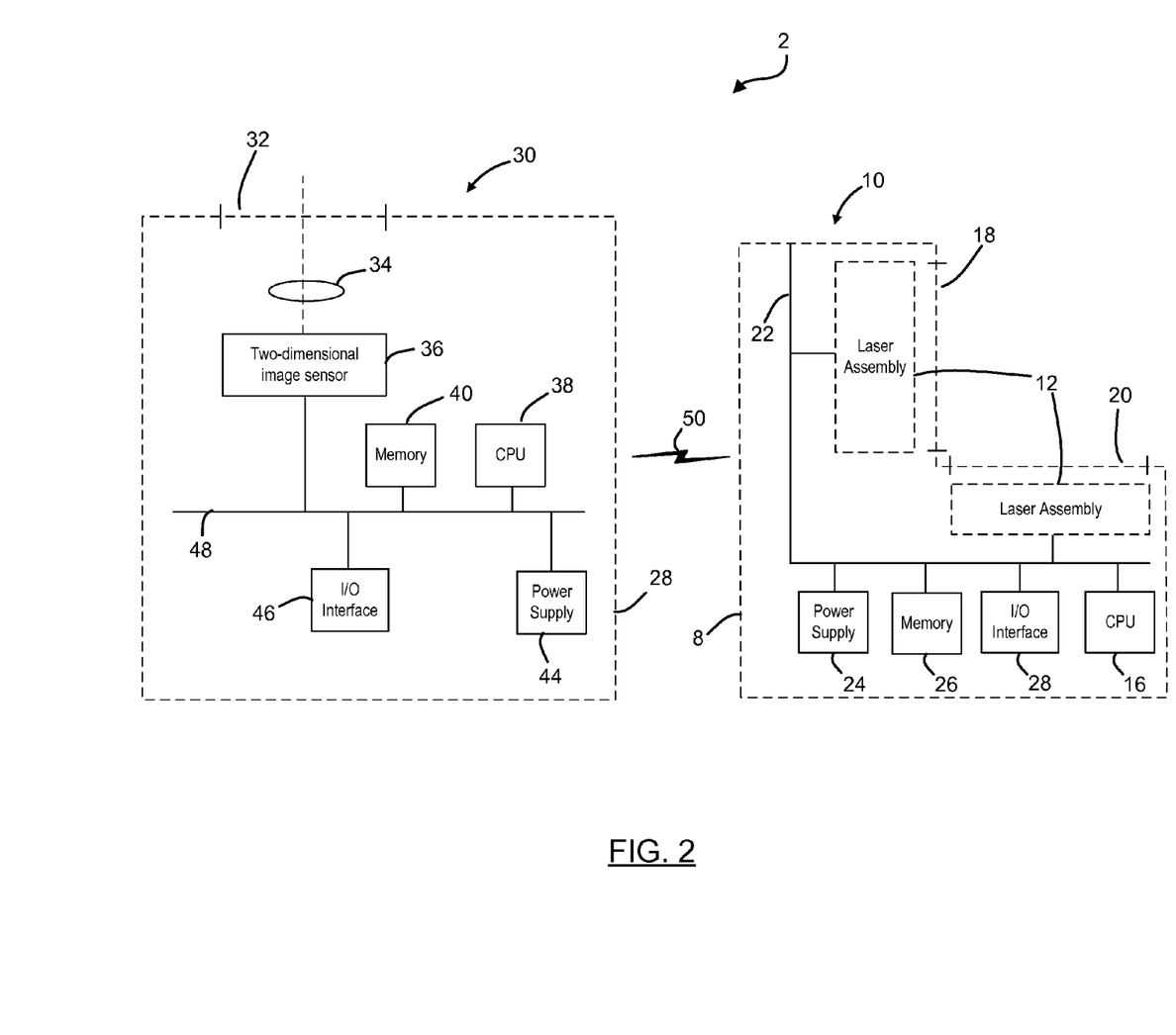
FIG. 2 is a block diagram of an imager terminal and barcode symbol scanning terminal in some embodiments having the components which can be incorporated in the configuration system.

The barcode symbol scanning terminal 10 can include a first scanning window 18 and a second scanning window 20. The first scanning window 18 is positioned in a first section 4 of scanning terminal housing 8, while the second scanning window 20 can be positioned in a second section 6 of scanning terminal housing 8. As illustrated, the first scanning window 18 and second scanning window 20 are substantially orthogonal to each other. In some embodiments, the first scanning window 18 and second scanning window 20 may be arranged side by side, or the first scanning window 18 and second scanning window 20 may be arranged at an angle less than 90° with respect to each other. As shown in FIG. 2, laser assemblies 12 may be located behind the first scanning window 18 and second scanning window 20. The laser assemblies 12 may be used to scan a bar code. In some embodiments, the barcode symbol scanning terminal 10 is operative to scan only 1D barcodes and is not operative to scan a 2D barcode. In one embodiment, the elements depicted as being within dashed border 8 of FIG. 2 can be disposed within scanning terminal housing 8 as shown in FIG. 1.

The 2D imager terminal 30 can be connected to the barcode symbol scanning terminal 10 through communication link 50 and can include a scanning window 32 disposed at a front of imager terminal housing 28. As shown in FIG. 2, the 2D imager terminal 30 may include a 2D image sensor 36 located behind scanning window 32. In some embodiments, the 2D imager terminal 30 may image a 2D barcode that is in front of the scanning window 32. The user may actuate trigger 52 to have the 2D imager terminal 30 capture an image of a barcode.

The 2D imager terminal 30 may communicate with the barcode symbol scanning terminal 10 through the communication link 50. The communication link 50 may include high speed cable, Bluetooth connection, keyboard wedge, RS232, IEE802.11 connection or any other suitable means of communication.

In some embodiments, the 2D imager terminal 30 may capture a frame of image data representing a 2D barcode. The 2D imager terminal 30 may be configured to determine programming data based upon the frame of image data representing a 2D barcode, and transmit the programming data through communication link 50 to the barcode symbol scanning terminal 10.

FIG. 2 illustrates a block diagram of the 2D imager terminal 30 and the barcode symbol scanning terminal 10 in accordance with some embodiments of the present invention. As discussed above, the 2D imager terminal 30 and the barcode symbol scanning terminal 10 may be in communication via communication link 50. The communication link 50 may be connected to the input/output (I/O) interface 46 of the 2D imager terminal 30 and the I/O interface 28 of the barcode symbol scanning terminal 10. In one embodiment, the elements depicted as being within dashed border 28 of FIG. 2 can be disposed within imager terminal housing 28, as shown in FIG. 1. Imager terminal housing 28 in one embodiment can be hand held.

The barcode symbol scanning terminal 10 can include a power supply 24, memory 26, I/O interface 28, central processing unit (CPU) 16, and two laser assemblies 12 communicatively coupled together via system bus 22. As illustrated, each laser assembly is positioned behind one of the scanning windows 18, 20. Laser assembly 12 is discussed in detail below, and with respect to FIG. 3.

2D imager terminal 30 can include a 2D image sensor 36, CPU 38, memory 40, power supply 44 and I/O interface 46 communicatively coupled together via system bus 48. 2D image sensor 36 can be a CMOS image sensor having an M×N array of pixels, having a plurality of rows and columns of pixels. In some embodiments, the CPU 38 can be operative to communicate with memory 40 and store data in memory 40. 2D imager terminal 30 can be operative to capture frames of image data by readout, conversion, and storage of frame of image data into memory 40. Prior to readout of a frame, a frame can be exposed during an exposure period of 2D image sensor. In some embodiments, the CPU 38 may be further operative to communicate with, and transmit information, to the I/O interface 46.

Referring to further aspects of 2D imager terminal 30, a lens assembly 34 can be adapted for focusing an image of a bar code located within a field of view onto image sensor 36. Imaging light rays can be transmitted using various means not illustrated (e.g., LEDs, light sources, etc.) about imaging axis 42. Lens assembly 34 can be adapted to be capable of multiple focal lengths and multiple best focus distances. Lens assembly 34 may include a focusing apparatus (e.g., a lens element, a fluid lens element or a pump in combination with a lens element, etc.) employed alone or in combination with other optical elements (e.g., a deformable fluid lens element, an electrowetting fluid lens element, or a traditional non-deformable solid (e.g., glass, polycarbonate lens element).

With an image of a 2D barcode focused, the 2D image sensor 36 may capture a frame of image data representing the 2D barcode.

After the frame of image data has been captured, it may be processed by the CPU 38 to determine a set of programming data. The CPU 38 may include firmware that allows the CPU 38 to decode information from the image of the 2D barcode, and determine programming data based upon the decoded information. The programming data may be operative to configure the barcode symbol scanning terminal 10. In some embodiments, the CPU 38 may be further operative to determine programming data based upon the decoded information that is for configuring the 2D imager terminal 30.

The CPU 38 may communicate the determined programming data to the I/O interface 46 via system bus 48. The I/O interface 46 of the 2D imager terminal 30 may then transmit the determined programming data to the I/O interface 28 of the barcode symbol scanning terminal 10 via the communication link 50.

The received programming data may be communicated from the I/O interface 28 to the CPU 16 via system bus 22. The CPU 16 may then use the received programming data to configure parameters and devices of the barcode symbol scanning terminal 10. Thus, barcode symbol scanning terminal 10 may be configured using programming data determined by the 2D imager terminal 30 that are based upon a scanned 2D barcode.

In some embodiments, the 2D imager terminal 30 may also be configured based upon the programming data. For instance, the CPU 38 of the 2D imager terminal 30 may use the programming data to configure devices of the 2D imager terminal 30. In some embodiments, the 2D imager terminal 30 and the barcode symbol scanning terminal 10 may be simultaneously configured based upon the programming data.

While in the above description, the imager terminal 30 determines the programming data, it is within the scope of the present invention for the imager terminal 30 to transmit only the captured frame of image data of the 2D barcode (conveniently in an image file format, e.g., BMP, TIF, JPG) to the barcode symbol scanning terminal 10, and for the barcode symbol scanning terminal 10 to determine the programming data based upon the captured 2D frame of image data. Furthermore, the programming data can be formatted in any suitable format, including Extensible Markup Language format.

Figure 3:
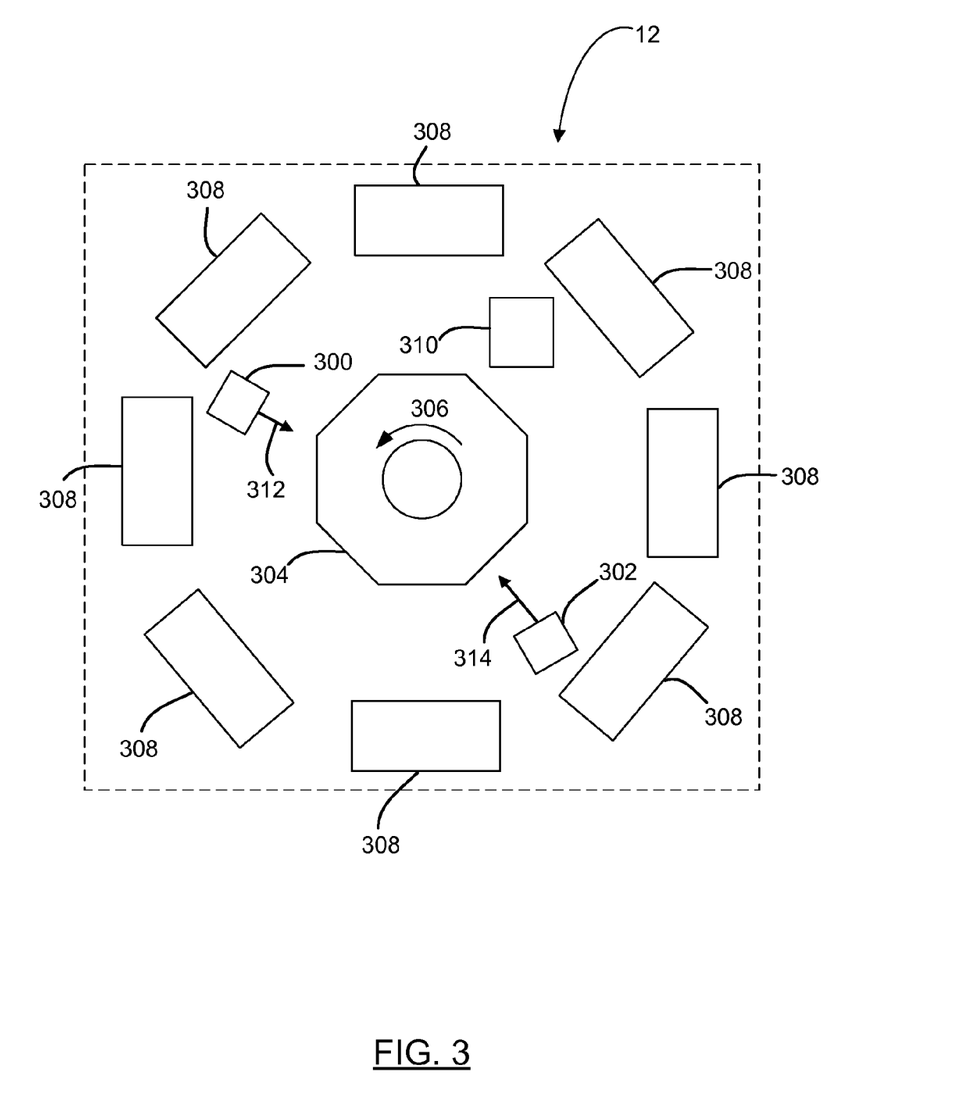
FIG. 3 is a diagram illustrating a laser assembly according to some embodiments of the present invention.

FIG. 3 illustrates the laser assembly 12. A first laser production module 300 produces a laser 312 directed at rotating, polygonal mirror 304. Polygonal mirror 304 rotates in a direction illustrated by arrow 306; however the rotation could be reversed in some embodiments. The polygonal mirror 304 includes a plurality of facets that reflect the laser 312 in different directions. A plurality of scanning planes are thus produced when the laser 312 reflects of off the different facets of the polygonal mirror 304. The polygonal mirror 304 may reflect the laser 312 through a scanning window 18, 20.

The laser reflected off the rotating mirror 304 may again be reflected off of an object, such as barcode, towards the laser assembly 12. The mirrors 308 may collect the laser beams reflected from the object, and focus such collected light onto a photodetector 310 which produces an electrical signal whose amplitude is proportional to the intensity of light focused thereon. The electrical signal produced by the photodetector 310 is supplied to analog/digital signal processing circuitry (not illustrated), which processes analog and digital scan data signals to perform bar code symbol reading operations, or any other required operation.

In some embodiments, a second laser production module 302 may produce a laser beam 314. The second laser production module 302 operates similarly to the first laser production module 300 and need not be discussed any further.

While barcode symbol scanning terminal 10 in the embodiment of FIGS. 1 and 2 is depicted as having two laser assemblies 12, barcode symbol scanning terminal 10 can be configured to have a greater number of laser assemblies 12 or a lesser number of laser assemblies, 12, i.e., zero or one laser assembly 12. In addition, while elements 12, 16, 22, 24, 26, 28, 34, 36, 38, 40, 44, 46, 48 are shown in FIGS. 1 and 2 as being disposed in separate housings 8, 28, the elements 12, 16, 22, 24, 26, 28, 34, 36, 38, 40, 44, 46, 48 can be housed in a common housing. In such embodiment, a terminal can be provided having one or more two dimensional image sensor 36 which can be utilized for reading two dimensional barcodes and one or more laser assembly 12 which can be utilized for reading barcodes. In such embodiment where elements 12, 16, 22, 24, 26, 28, 34, 36, 38, 40, 44, 46, 48 are commonly housed in a common housing the system busses 22, 48 can be replaced by a common system bus so that communication of programming data can be via a system bus rather than via I/O interfaces 46, 48. Also, the plural CPU's, and power supplies, shown in FIG. 2 can be replaced by a single CPU and power supply. In such embodiment where the elements 12, 16, 22, 24, 26, 28, 34, 36, 38, 40, 44, 46, 48 are commonly housed in a common housing programming data determined by decoding a frame of image data captured utilizing 2D image sensor 36 can be utilized for configuring a laser assembly 12, e.g., a scan speed, laser intensity, a scan angle, symbologies enabled, good read output, etc. Programming data determined by decoding a single 2D bar code can be utilized for determining a plurality of operating parameters, e.g., those determining, e.g., scan speed, laser intensity, scan angle, symbologies enabled, good read output, etc. A housing that commonly houses elements 12, 16, 22, 24, 26, 28, 34, 36, 38, 40, 44, 46, 48 can be a housing adapted for mounting at a checkout counter and such housing can be mounted at a checkout counter.

Figure 4:
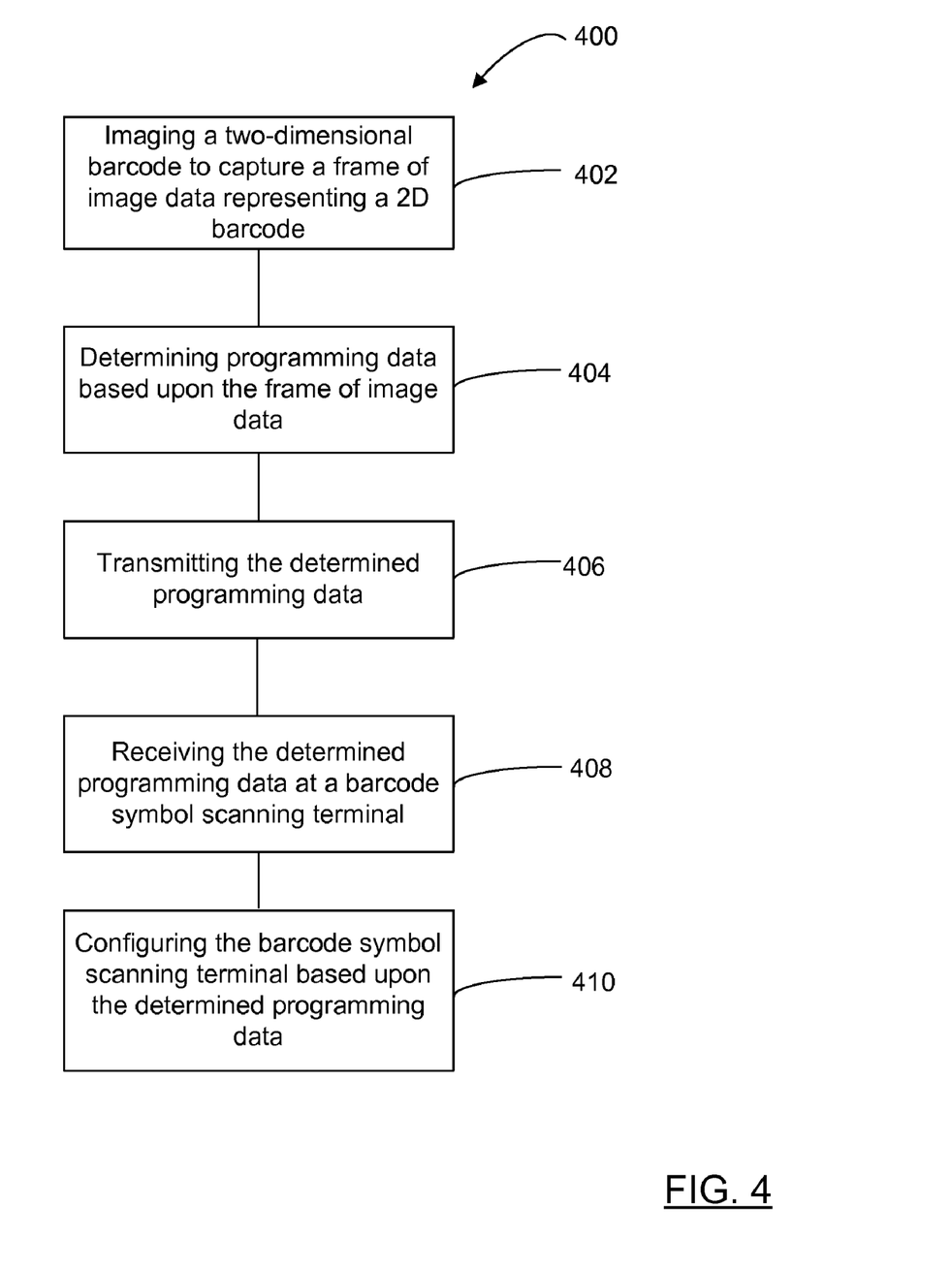
FIG. 4 is a flow diagram illustrating a method of operation in accordance with some embodiments of the present invention.

FIG. 4 is a flow diagram illustrating a method of operation 400 in accordance with an embodiment of the present invention.

In step 402, a frame of image data representing a 2D barcode is captured using the 2D image sensor 36 of the 2D imager terminal 30.

The 2D imager terminal 30 may determine programming data based on the frame of image data representing the 2D barcode and as illustrated in step 404. In some embodiments, where a frame of image data represents a 2D barcode symbol, a decode attempt which can be performed by CPU 38 can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. 2D imager terminal 30 can be operative for decoding a plurality of types of 2D barcodes, e.g., Aztec, Maxi Code, Data Matrix, Code 1, QR Code and other types of matrix codes.

In step 406, the 2D imager terminal 30 may transmit the programming data to the barcode symbol scanning terminal 10, which then receives the determined programming data in step 408.

In step 410, the barcode symbol scanning terminal 10 may be configured based upon the determined programming data. Some of the devices that may be configured include an I/O interface 28 and laser assembly 12.

In some embodiments, the 2D imager terminal 30 may also be configured based upon the determined programming data, and in some embodiments, the 2D imager terminal 30 and barcode symbol scanning terminal 10 are simultaneously configured based on the programming data. Some of the devices that may be configured by the 2D imager terminal 30 include a radio transceiver device, imaging sensor 36.

Figure 5:
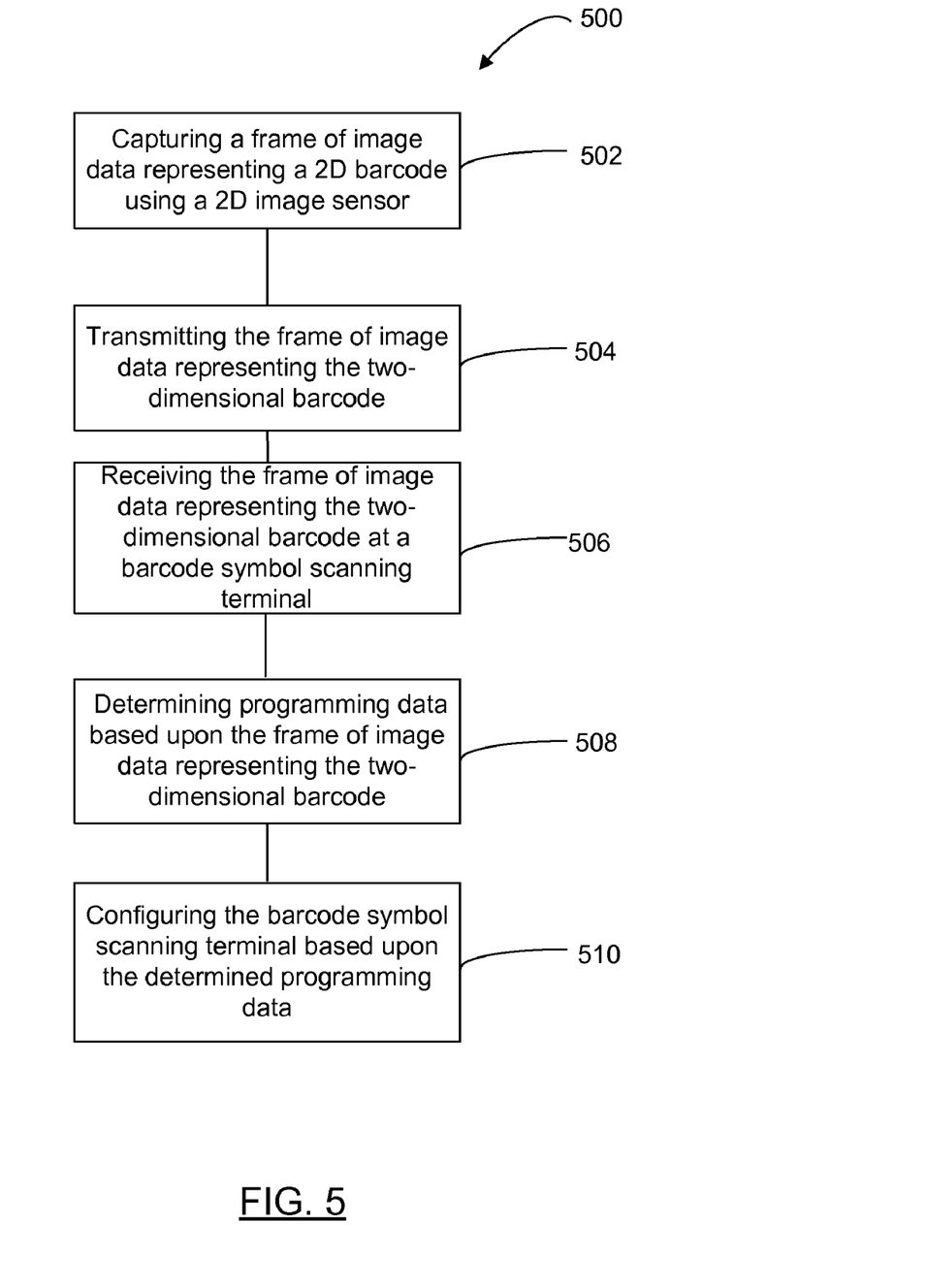
FIG. 5 is a flow diagram illustrating a method of operation in accordance with some embodiments of the present invention.

FIG. 5 is a flow diagram illustrating a method of operation 500 in accordance with an embodiment of the present invention.

In step 502, a frame of image data representing the 2D barcode is captured using the 2D image sensor 36 of the 2D imager terminal 30.

In step 504, a frame of image data representing the 2D barcode (conveniently formatted in an image file format) is transmitted from the 2D imager terminal 30 to the barcode symbol scanning terminal 10.

In step 506, the frame of image data representing the 2D barcode is received at the barcode symbol scanning terminal 10.

In step 508, the barcode symbol scanning terminal 10 may determine programming data based upon the frame of image data of the 2D barcode. For instance, the barcode symbol scanning terminal 10 may decode the frame of image data representing a 2D barcode symbol that encodes the programming data.

In step 510, the barcode symbol scanning terminal 10 may be configured based upon the determined programming data.

In some embodiments, the barcode symbol scanning terminal 10 may transmit the programming data to the 2D imager terminal 30. The 2D imager terminal 30 may also be configured based upon the programming data, and in some embodiments, may be simultaneously configured with the barcode symbol scanning terminal 10.

In the development of configuration system 2 it was observed that in some cases, the barcode symbol scanning terminal 10 can be unable to scan and process a 2D barcode. Instead, the barcode symbol scanning terminal 10 is limited to scanning and processing a 1D barcode. It was further observed that encoding programming data utilizing 1D barcodes can be disadvantageous because of significant encoding byte limits of such bar codes. In one embodiment, a single 2D barcode can hold as much information as several 1D barcodes. In some cases, the 2D barcode may encode several parameters at once, while a 1D barcode is limited to configuring a single parameter. The amount of time needed to configure the barcode symbol scanning terminal 10 increases when scanning several 1D barcodes instead of a single 2D barcode, and also makes the process more prone to errors since the user may improperly scan one of the numerous 1D barcodes. For instance, all of the 1D barcodes necessary for programming must be scanned by the barcode symbol scanning terminal 10 in a specific scan plane that can be read by the barcode symbol scanning terminal 10. If one 1D barcode is not scanned in the proper scan plane, the 1D barcode may not be read and the barcode symbol scanning terminal 10 may not be properly programmed.

Further in the development of configuration system 2, it was noted that a further disadvantage exists when the 2D imager terminal 30, such as an auxiliary 2D imager terminal 30, is coupled to the barcode symbol scanning terminal 10. The 2D imager terminal 30 may be configured by using a single 2D barcode, while the barcode symbol scanning terminal 10 may be configured using several 1D barcodes. Thus, the 2D imager terminal 30 and the barcode symbol scanning terminal 10 are configured using different barcodes and processes. This is both cumbersome and time consuming for a user.

To overcome these problems, a barcode symbol scanning terminal 10 may be connected to a 2D imager terminal 30. The 2D imager terminal 30 may scan a 2D barcode and transmit information relating to the 2D barcode to the barcode symbol scanning terminal 10. Both the 2D imager terminal 30 and the barcode symbol scanning terminal 10 may be configured based upon the information relating to the 2D barcode. Accordingly, even if the barcode symbol scanning terminal 10 cannot properly scan a 2D barcode, the barcode symbol scanning terminal 10 may still be configured using 2D barcode information from the 2D imager terminal 30.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

I claim:

1. A configuration system for configuring a barcode symbol scanning terminal using a two-dimensional barcode, comprising:

a two-dimensional imager terminal including a central processing unit (CPU), memory communicatively coupled to the CPU, and a 2D image sensor, and an imager terminal housing in which there is disposed the 2D image sensor, wherein the two-dimensional imager terminal is configured to capture a frame of image data representing a two-dimensional barcode, wherein the two-dimensional imager terminal is configured to determine programming data based upon the frame of image data representing the two-dimensional barcode, the two-dimensional imager terminal further including an input/output (I/O) interface for transmitting the determined programming data;

a barcode symbol scanning terminal including a second CPU, a second memory communicatively coupled to the CPU, a scanning terminal housing comprising a first section and a second section, a first laser assembly disposed within the first section of the scanning terminal housing, the first laser assembly including a first laser beam generation unit for generating a first laser beam, one or more mirrors for projecting and scanning the first laser beam, one or more second mirrors for focusing a first reflected laser beam onto a first photodetector unit, the first photodetector unit being configured for detecting the first reflected laser beam, the barcode symbol scanning terminal further including a second laser assembly disposed within the second section of the scanning terminal housing, the second laser assembly including a second laser beam generation unit for generating a second laser beam, one or more third mirrors for projecting and scanning the second laser beam, one or more fourth mirrors for focusing a second reflected laser beam onto a second photodetector unit, the second photodetector unit being configured for detecting the second reflected laser beam, the barcode symbol scanning terminal further including a second I/O interface for receiving the determined programming data from the second I/O interface of the two-dimensional imager terminal, wherein the barcode symbol scanning terminal is operative to be configured based upon the determined programming data received from the two-dimensional imager terminal, wherein the programming data is utilized to determine operating parameters of the bar code symbol scanning terminal.

2. The configuration system of claim 1, wherein the two-dimensional imager terminal is also configured based upon the determined programming data.

3. The configuration system of claim 2, wherein the two-dimensional imager terminal and barcode symbol scanning terminal are simultaneously configured based upon the determined programming data.

4. The configuration system of claim 1, wherein the barcode symbol scanning terminal is configured to scan one-dimensional barcodes.

5. The configuration system of claim 1, wherein the determined programming data is adapted to configure a plurality of operating parameters of the barcode symbol scanning terminal.

6. The configuration system of claim 1, wherein the determined programming data is in an Extensible Markup Language format.

7. The configuration system of claim 1, wherein the two-dimensional imager terminal is an external auxiliary scanner coupled to the barcode symbol scanning terminal.

8. The configuration system of claim 1, wherein the 2D image sensor is an image sensor selected from the group consisting of is an optical imager comprising a CCD image sensor and a CMOS image sensor.

9. A method for configuring a barcode symbol scanning terminal, comprising the steps of:

imaging a two-dimensional barcode using an image sensor of a two-dimensional imager terminal to capture a frame of image data representing the two-dimensional barcode, wherein the imager terminal includes a central processing unit (CPU), memory communicatively coupled to the CPU, a 2D image sensor, and an imager terminal housing in which there is disposed the 2D image sensor, and an input/output (I/O) interface;

determining programming data based upon the frame of image data representing the two-dimensional barcode using the two-dimensional imager terminal;

transmitting the determined programming data using the I/O interface of the two-dimensional imager terminal, wherein the programming data is transmitted to a barcode symbol scanning terminal that includes a second CPU, a memory communicatively coupled to the second CPU, a scanning terminal housing comprising a first section and a second section, a first laser assembly disposed within the first section of the scanning terminal housing, the first laser assembly including a first laser beam generation unit for generating a first laser beam, one or more mirrors for projecting and scanning the first laser beam, one or more second mirrors for focusing a first reflected laser beam onto a first photodetector unit, the first photodetector unit being configured for detecting the first reflected laser beam, the barcode symbol scanning terminal further including a second laser assembly disposed within the second section of the scanning terminal housing, the second laser assembly including a second laser beam generation unit for generating a second laser beam, one or more third mirrors for projecting and scanning the second laser beam, one or more fourth mirrors for focusing a second reflected laser beam onto a second photodetector unit, the second photodetector unit being configured for detecting the second reflected laser beam, the two-dimensional imager terminal further including a second I/O interface; receiving the determined programming data at the second I/O interface of the barcode symbol scanning terminal; and configuring the barcode symbol scanning terminal based upon the determined programming data received from the two-dimensional imager terminal and wherein the configuring comprises determining operating parameters of the barcode symbol scanning terminal.

10. The method of claim 9, further including the step of configuring the two-dimensional imager terminal based upon the determined programming data.

11. The method of claim 10, wherein the steps of configuring the two-dimensional imager terminal and configuring the barcode symbol scanning terminal occur simultaneously.

12. The method of claim 9, wherein the barcode symbol scanning terminal is operable to scan one-dimensional barcodes.

13. The method of claim 9, wherein the determined programming data is adapted to configure a plurality of operating parameters of the barcode symbol scanning terminal.

14. The method of claim 9, wherein the determined programming data is in an Extensible Markup Language format.

15. The method of claim 9, wherein the 2D image sensor is an image sensor selected from the group consisting of CCD image sensor and a CMOS image sensor.

16. A barcode symbol scanning terminal comprising:
a CPU;
a memory communicatively coupled to the CPU;
a scanning terminal housing comprising a first section and a second section;
a first laser assembly disposed within the first section of the scanning terminal housing, the first laser assembly including a first laser beam generation unit for generating a first laser beam, one or more mirrors for projecting and scanning the first laser beam, one or more mirrors for focusing a first reflected laser beam onto a first photodetector unit, the first photodetector unit being configured for detecting the first reflected laser beam;
a second laser assembly disposed within the second section of the scanning terminal housing, the second laser assembly including a second laser beam generation unit for generating a second laser beam, one or more mirrors for projecting and scanning the second laser beam, one or more second mirrors for focusing a second reflected laser beam onto a second photodetector unit, the photodetector unit being configured for detecting the second reflected laser beam; and
an I/O interface for receiving data from a second I/O interface of a two-dimensional imager terminal, wherein the barcode symbol scanning terminal is operative to be configured based upon received data, the received data being one or more of programming data that has been determined by the two-dimensional imager terminal decoding of a 2D barcode symbol, and image data representing a 2D barcode symbol encoding programming data, wherein said bar code scanning terminal is operative to utilize the received data for determining operating parameters of the barcode symbol scanning terminal.

17. The barcode symbol scanning terminal of claim 16, wherein the barcode symbol scanning terminal is adapted to utilize the received data to configure a plurality of operating parameters of the barcode symbol scanning terminal.

18. The barcode symbol scanning terminal of claim 16, wherein the received data is programming data in an Extensible Markup Language format.

19. The barcode symbol scanning terminal of claim 16, wherein the barcode symbol scanning terminal is devoid of a two-dimensional image sensor.

20. A configuration system for configuring a barcode symbol scanning terminal using a two-dimensional barcode, comprising:
a two-dimensional imager terminal including a central processing unit (CPU), memory communicatively coupled to the CPU, and a 2D image sensor and an imager terminal housing in which there is disposed the 2D image sensor, wherein the two-dimensional imager terminal is configured to capture a frame of image data representing a two-dimensional barcode, wherein the two-dimensional imager terminal is configured to perform one or more of (a) determining programming data based upon the frame of image data representing the two-dimensional barcode and (b) transmitting the frame of image data representing a two-dimensional bar code, the two-dimensional imager terminal further including an input/output (I/O) interface for transmitting one or more of determined programming data and the frame of image data representing the two-dimensional bar code;
a barcode symbol scanning terminal including a second CPU, a second memory communicatively coupled to the second CPU, a scanning terminal housing comprising a laser assembly having a laser beam generation unit for generating a laser beam, one or more mirrors for projecting and scanning the laser beam, one or more mirrors for focusing a first reflected laser beam onto a photodetector unit, the photodetector unit being configured for detecting the reflected laser beam, the barcode symbol scanning terminal further including a second I/O interface for receiving one or more of the determined programming data and the frame of image data representing the two dimensional bar code from the I/O interface of the two-dimensional imager terminal, wherein the barcode symbol scanning terminal is operative to be configured based upon one or more of (a) the determined programming data received from the two-dimensional imager terminal, the determined programming data received from the two-dimensional imager terminal being utilized to determine operating parameters of the barcode symbol scanning terminal, and (b) the frame of image data representing the two dimensional bar code, the frame of image data representing the two dimensional bar code being processed to determine data that is utilized to determine operating parameters of the barcode symbol scanning terminal.

21. A method comprising:
providing a terminal including a 2D image sensor and a laser assembly, and a housing in which the 2D image sensor and the laser assembly are disposed;
imaging a two-dimensional barcode using a 2D image sensor of the terminal to capture a frame of image data representing the two-dimensional barcode, wherein the terminal includes a central processing unit (CPU), memory communicatively coupled to the CPU and an input/output (I/O) interface;
determining programming data based upon a processing of the frame of image data representing the two-dimensional barcode;
utilizing the programming data for configuring the laser assembly disposed within the terminal housing the laser assembly including a laser beam generation unit for generating a laser beam, one or more mirrors for projecting and scanning the laser beam, one or more mirrors for focusing a reflected laser beam onto a photodetector unit, the photodetector unit being configured for detecting the reflected laser beam, wherein the configuring comprises determining operating parameters of the laser assembly.

22. The method of claim 9, wherein the laser assembly is operable for use in scanning one-dimensional barcodes.

23. The method of claim 9, wherein the determined programming data is adapted to configure a plurality of operating parameters of the laser assembly.

* * * * *